US008229754B1

(12) United States Patent
Ramirez et al.

(10) Patent No.: US 8,229,754 B1
(45) Date of Patent: Jul. 24, 2012

(54) SELECTING FEATURES OF DISPLAYED AUDIO DATA ACROSS TIME

(75) Inventors: Daniel Ramirez, Seattle, WA (US);
Todd Orler, Kirkland, WA (US);
Shenzhi Zhang, Bellevue, WA (US);
Jeffrey Garner, Issaquah, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1675 days.

(21) Appl. No.: 11/585,762

(22) Filed: Oct. 23, 2006

(51) Int. Cl.
*G10L 11/00* (2006.01)
*G01R 13/02* (2006.01)
*G01R 23/16* (2006.01)
*G06F 3/00* (2006.01)
*G06F 3/048* (2006.01)
*G06F 17/00* (2006.01)
*A63H 5/00* (2006.01)
*G10H 1/08* (2006.01)
*G06T 11/20* (2006.01)
*G11B 27/02* (2006.01)
*H04B 1/00* (2006.01)
*H04B 7/00* (2006.01)

(52) U.S. Cl. ........... 704/278; 704/270; 702/67; 702/76; 715/740; 715/771; 84/625; 84/609; 345/440; 360/13; 381/119; 700/94; 455/523

(58) Field of Classification Search .................. 704/270, 704/278; 381/119; 700/94
See application file for complete search history.

(56) References Cited

U.S. PATENT DOCUMENTS

| | | | | |
|---|---|---|---|---|
| 3,320,531 A | * | 5/1967 | Wu William I L | ......... 324/76.23 |
| 4,306,113 A | * | 12/1981 | Morton | ............................ 381/58 |
| 4,539,518 A | * | 9/1985 | Kitayoshi | .................. 324/76.21 |
| 4,868,687 A | * | 9/1989 | Penn et al. | ....................... 360/13 |
| 5,204,969 A | * | 4/1993 | Capps et al. | ................... 704/278 |
| 5,365,592 A | * | 11/1994 | Horner et al. | .................. 704/250 |
| 5,532,936 A | * | 7/1996 | Perry | ............................... 702/76 |
| 5,675,778 A | * | 10/1997 | Jones | ................................ 701/1 |
| 5,737,725 A | * | 4/1998 | Case | ............................ 704/260 |
| 5,758,180 A | * | 5/1998 | Duffy et al. | ..................... 710/122 |
| 5,792,971 A | * | 8/1998 | Timis et al. | ...................... 84/609 |
| 5,970,455 A | * | 10/1999 | Wilcox et al. | ................. 704/270 |
| 6,021,204 A | * | 2/2000 | Eastty | ............................. 381/12 |
| 6,029,194 A | * | 2/2000 | Tilt | .................................. 725/94 |
| 6,154,600 A | * | 11/2000 | Newman et al. | ................... 386/4 |
| 6,167,350 A | * | 12/2000 | Hiramatsu et al. | .............. 702/67 |
| 6,184,898 B1 | * | 2/2001 | Rice et al. | ...................... 345/440 |

(Continued)

OTHER PUBLICATIONS

Adobe Audtion User Guide for Windows. Copyright 2003 Adobe Systems Inc. Retrieved from the Internet Archive Wayback Machine archive date Aug. 24, 2003.*

(Continued)

*Primary Examiner* — Pierre-Louis Desir
*Assistant Examiner* — Matthew Baker
(74) *Attorney, Agent, or Firm* — Fish & Richardson P.C.

(57) ABSTRACT

Systems, methods, and computer program products for graphically displaying audio data are provided. In some implementations, a method is provided. The method includes displaying a graphical visual representation of digital audio data, the representation displaying a feature of the audio data on a feature axis with respect to time on a time axis. The method also includes receiving an input in the graphical visual representation selecting a range with respect to the feature and automatically extending the selected range with respect to time to define a selected region of the visual representation, where the extended range with respect to time is predefined and ignoring any component of the received input with respect to time.

24 Claims, 3 Drawing Sheets

U.S. PATENT DOCUMENTS

| | | | |
|---|---|---|---|
| 6,502,045 B1 * | 12/2002 | Biagiotti | 702/66 |
| 6,721,409 B1 * | 4/2004 | Dell et al. | 379/202.01 |
| 6,782,365 B1 * | 8/2004 | Case | 704/278 |
| 6,839,441 B1 * | 1/2005 | Powers et al. | 381/119 |
| 6,959,220 B1 * | 10/2005 | Wiser et al. | 700/94 |
| 7,013,430 B2 * | 3/2006 | Jaffe | 715/771 |
| 7,016,746 B2 * | 3/2006 | Wiser et al. | 700/94 |
| 7,024,677 B1 * | 4/2006 | Snyder et al. | 725/86 |
| 7,174,293 B2 * | 2/2007 | Kenyon et al. | 704/231 |
| 7,231,054 B1 * | 6/2007 | Jot et al. | 381/310 |
| 7,243,073 B2 * | 7/2007 | Yeh et al. | 704/500 |
| 7,459,898 B1 * | 12/2008 | Woodings | 324/76.19 |
| 7,496,480 B2 * | 2/2009 | Joffrain et al. | 702/189 |
| 7,548,791 B1 * | 6/2009 | Johnston | 700/94 |
| 7,640,069 B1 * | 12/2009 | Johnston | 700/94 |
| 7,720,646 B2 * | 5/2010 | Miyano | 702/189 |
| 7,742,609 B2 * | 6/2010 | Yeakel et al. | 381/119 |
| 7,786,370 B2 * | 8/2010 | Ludwig | 84/645 |
| 7,797,154 B2 * | 9/2010 | Ichikawa | 704/226 |
| 2004/0030425 A1 * | 2/2004 | Yeakel et al. | 700/94 |
| 2004/0037437 A1 * | 2/2004 | Symons et al. | 381/92 |
| 2004/0076301 A1 * | 4/2004 | Algazi et al. | 381/17 |
| 2004/0095381 A1 * | 5/2004 | McDowell | 345/740 |
| 2005/0261847 A1 * | 11/2005 | Nara | 702/76 |
| 2007/0270988 A1 * | 11/2007 | Goldstein et al. | 700/94 |
| 2007/0287490 A1 * | 12/2007 | Green et al. | 455/523 |
| 2008/0004729 A1 * | 1/2008 | Hiipakka | 700/94 |
| 2008/0041220 A1 * | 2/2008 | Foust et al. | 84/625 |
| 2008/0201092 A1 * | 8/2008 | Connolly | 702/67 |

OTHER PUBLICATIONS

Klingbeil, Michael. Software for Spectral Analysis, Editing, and Syntehsis. ICMC 2005 paper 1121. Retrieved from Wayback Machine from file cached Dec. 15, 2005. http://web.archive.org/web/20051215215234/http://klingbeil.com/papers/spearfinal05.pdf.*

Adobe Audition 1.5 Edit audio with frequency-specific precision. Retrieved from Adobe tutorials with webpage attached. Page created Mar. 15, 2004. http://www.adobe.com/designcenter/audition/articles/audl5freqedit_02.html.*

Cool edit pro v. 2 User's Manual 2002. Syntrillium Software Corporation.*

M Laurson, M Kuuskankare. PWGL ediots: 2d-ediotr as a case study. SMC conference 2004.*

Rice, Stephen. Frequency-Based Coloring of the Waveform Display fto Facilitate Audio Editing and Retrieval. AES 119th Convention. Oct. 7-10, 2005.*

Adobe Audition 2.0 as a sound editor by Music-Software-Reviews. com cached May 13, 2006. http://web.archive.org/web/20060513175903/http://www.music-software-reviews.com/adobe_audition_2.html.*

Pro Tools Reference Guide Version 7.0. Digidesign and Avid Technology. 2005.*

* cited by examiner

SELECTING FEATURES OF DISPLAYED AUDIO DATA ACROSS TIME

BACKGROUND

This specification relates to displaying visual representations of features of audio data.

Different visual representations of audio data, in particular digital audio data, are commonly used to display different features of the audio data. For example, a frequency spectrogram shows a representation of frequencies of the audio data in the time-domain (e.g., a graphical display with time on the x-axis and frequency on the y-axis). Similarly, an amplitude display shows a representation of audio intensity in the time-domain (e.g., a graphical display with time on the x-axis and intensity on the y-axis).

SUMMARY

Systems, methods, and computer program products for graphically displaying audio data are provided. In general, in one aspect, a method and computer program product, respectively, are provided. The method and computer program product include displaying a graphical visual representation of digital audio data, the representation displaying a feature of the audio data on a feature axis with respect to time on a time axis, receiving an input in the graphical visual representation selecting a range with respect to the feature and automatically extending the selected range with respect to time to define a selected region of the visual representation, where the extended range with respect to time is predefined and ignoring any component of the received input with respect to time.

Implementations can include one or more of the following features. Receiving the input can include receiving a first point selected in the graphical visual representation with a selection tool, the first point having a first feature value, receiving a dragging of the selection tool in a to a second point in the visual representation, the second point having a second feature value, and defining the range with respect to the feature using the first and second feature values. The range with respect to the feature can be the vertical range of feature values from the first point to the second point. The first point can define a center of the range such that the range is equal to twice the vertical displacement between the first point and the second point in the graphical visual representation. Extending the selected range with respect to time can include defining an extended selection as a region defined by selected range and the entire lengths of the audio data with respect to time.

The visual representation can be a frequency spectrogram and selecting a range of the visual representation with respect to the displayed feature can include selecting one or more frequencies of the frequency spectrogram. The visual representation can be a pan position graph and selecting a range of the visual representation with respect to the displayed feature can include selecting one or more pan positions of the pan position graph. The method and computer program product can further include receiving an input to perform an editing operation on the extended selection and performing the editing operation on the audio data.

In general, in another aspect, a system is provided. The system includes a user interface device and one or more computers operable to interact with the user interface device and to display a visual representation of digital audio data, the visual representation displaying a feature of the audio data with respect to time, receive an input in the visual representation corresponding to a selected range with respect to the feature, and automatically extend the selected range with respect to time to define a selected region of the visual representation.

Implementations of the system can include one or more of the following features. The one or more computers can include a server operable to interact with the user interface device through a data communication network, and the user interface device can be operable to interact with the server as a client. The user interface device comprises a personal computer running a web browser, a mobile telephone running a wireless application protocol (WAP) browser. The one or more computers comprises one personal computer, and the personal computer comprises the user interface device.

Particular embodiments of the subject matter described in this specification can be implemented to realize one or more of the following advantages. A user can make a selection with respect to a feature of audio data without having to drag a selection region with respect to time. Automatically extending the time selection allows the user to easily make a precise selection with regard to a particular feature of the audio data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
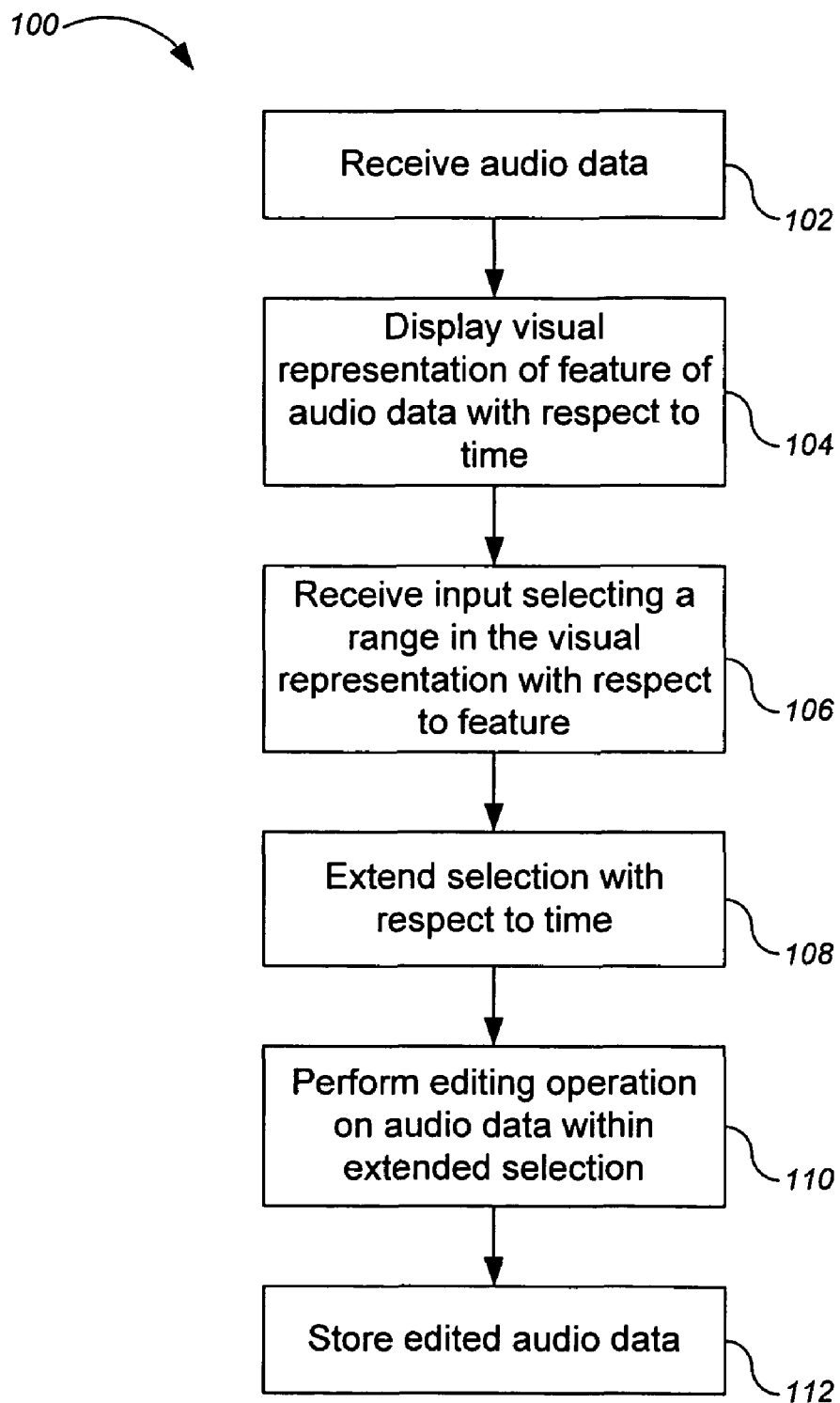
FIG. 1 shows an example process for selecting a portion of a visual representation of audio data.

FIG. 1 shows an example process 100 for selecting a portion of a visual representation of audio data. The process 100 may be performed, for example, using a user interface such as displays 200 and 300 shown in FIGS. 2 and 3, respectively. For clarity of presentation, the description that follows uses the displays 200 and 300 as the basis of examples for describing the process 100. However, another display, interface, or combination of interfaces, may be used to perform the process 100. The process 100 can be performed by a system, for example, an audio editing system.

The process 100 begins with receiving (102) digital audio data. For example, audio data may be received from an audio file in an audio storage device or from another source, such as, a data stream, a network source, or a container document (e.g., an XML document).

The process 100 displays (104) a graphical visual representation ("visual representation") of a feature of the audio data with respect to time. That is, the visual representation presents a feature of the audio data, such as frequency or pan position, as it changes over time. The visual representation is generated by the system from the audio data and displayed on a display device. For example, the display 200 presents a visual representation of the audio data as a frequency spectrogram 202, showing a frequency feature of the audio data with respect to time. The display 300 presents a visual representation of the audio data as a pan position graph 302 showing a pan position feature of the audio data with respect to time.

In some implementations, the visual representations can be part of an editing interface for performing editing operations on the audio data. For example, the displays 200 and 300 can provide a portion of audio editor interfaces for use in performing editing operations on the audio data (e.g., in response to one or more user inputs). The display 200 presents frequency along a vertical axis and time along a horizontal axis. The display 300 presents pan position along a vertical axis and time along a horizontal axis.

The frequency spectrogram 202 displays the frequency components of the audio data in the time domain. In the frequency spectrogram 202, the vertical frequency axis provides a frequency scale identifying the frequencies of the displayed audio data (e.g., in hertz). The frequency scale can be, for example, a linear, logarithmic, or other scale. The scale of the frequency axis can be modified by the user in order to zoom in on a particular frequency range. The horizontal axis represents time, for example, in fractions of a second. In some implementations of the frequency spectrogram 202, separate frequency displays are presented corresponding to audio data from separate audio channels (i.e., separate audio streams of the audio data provided by different recording devices, e.g., separate microphones).

In a pan position graph, the pan position refers to the spatial position of particular audio data at any given time in terms of relative distance to the left or right of center. For example, an orchestra includes various musical instruments positioned at different spatial positions on a stage. The violins are typically on the left side of the stage, while the cellos are typically on the right side of the stage. The sound from the violins, therefore, originates from a different pan position than the sound from the cellos. Thus, the audio data corresponding to the violins can be distinguished from the audio data corresponding to the cellos according to the pan position of the audio data.

In the pan position graph 302, the vertical displacement axis shows the relative displacement of particular components of the audio data to the right or the left of center as a percentage to the left or right from 0 to 100. Thus, at any particular point in time, the audio data can include multiple different pan positions (e.g., different instruments of the orchestra playing simultaneously from different stage locations). The scale of the displacement axis can be modified, for example by user input, in order to zoom in on a particular range of pan positions (e.g., to zoom in on audio data from just the left). The displayed audio data in the pan position graph 302 is adjusted to correspond to user changes in the scale. As with the frequency spectrogram 202, the pan position graph 302 includes a horizontal axis representing time.

The system provides various tools that a user can use to interact with the visual representations of the audio data in the displays 200 and 300. Particularly, the user displays 200 and 300 include one or more selection tools allowing the user to select a portion of the visual representation of the audio data, such as a range of frequencies or pan positions. For example, geometric selection tools (e.g., a rectangle tool, a circle tool, or a tool of another geometric shape) can be positioned and sized within the displays 200 and 300 to select a particular portion. In another example, the user can select a region using freehand drawing tools (e.g., a lasso tool) that allow the user to select an arbitrary portion of the visual representation. The lasso tool can be used to select a portion of the visual representation having any shape the user chooses.

In another example, the selection tools can also include one or more automatic selection tools that can be used to automatically select a portion of the audio data, such as a portion of the audio data according to amplitude. Thus, only a portion having a threshold amplitude level is selected, where the selection can be shown in the displayed visual representation (e.g., a pan region having audio data of a particular amplitude or a frequency spectrogram region having audio data of a particular amplitude).

The process 100 receives (106) an input selecting a portion of the audio data with respect to the feature (e.g., frequency, pan position), generally by using the visual representation. For example, a user can provide an input in the displays 200 and 300 using one of the selection tools described above. The selection tools can optionally be configured to perform a selection with respect to a feature range only, ignoring input along a second axis (e.g., ignoring a time component). In another example, a user can select a portion of the frequency spectrogram 202 or pan position graph 302 using a particular selection tool (e.g., a cursor selection tool) configured for selecting a feature range only.

In particular, using the cursor selection tool, the user can make a frequency selection including one or more particular frequencies by clicking and dragging the cursor selection tool within the visual representation. In some implementations, the user drags the cursor selection tool from a first position 204 to a second position 206, in the frequency spectrogram 202 as represented by dashed line 208. The starting position 204 and the ending position 206 in the vertical direction (e.g., the vertical displacement in the frequency spectrogram 202 along the frequency axis) define a range of frequencies to be included in the frequency selection. Alternatively, the first position 204 and second position 206 can be reversed so that the user makes a frequency selection by dragging the cursor in the reverse direction.

In some implementations, the user selection of a feature of a particular visual representation can be defined differently based on the cursor movement. For example, the user can make a pan position selection by clicking and dragging the cursor from a first position 304 to a second position 306, in pan position graph 302 as represented by dashed line 308. In this example, the first position 304 defines a vertical center of the selection. The second position 306 defines a range to be expanded on both sides of the vertical center. Thus, the pan position selection includes the pan range of the cursor displacement and an equal pan range in the opposite direction from the first position 304. Alternatively, a user can drag the cursor from the center to the top of the selection or from an edge of the region to the center of the selection.

The pan position selection in the pan position graph 302 corresponds to a spatial range for a particular portion of the audio data. Referring again to the example orchestra discussed above, a noise component that the user wants to remove can be identified by audio data located at a particular pan location, for example, on the left side of the stage. For example, the noise component can correspond to a undesired noise component in the second violins section. The user can manually identify the presence of the noise component, for example, through visual or audio examination of the audio data. Alternatively, the user can identify the noise component using an automated audio processing application. Therefore, the user can select, within the pan position graph, a selection corresponding to a region of the left side of the orchestra where the noise component originated.

Both of the selection techniques described above can be used with different types of visual representations. For example, a selection defined as the range from a first position to a second position as described above with respect to the frequency spectrogram 202 can be used with a pan position graph (e.g., pan position graph 302). Additionally, a selection as described above with respect to the pan position graph 302 can be used with a frequency spectrogram (e.g., frequency spectrogram 202). Further, the selection techniques can be used with visual representations of different features of audio data such as an amplitude waveform or phase display.

Figure 2:
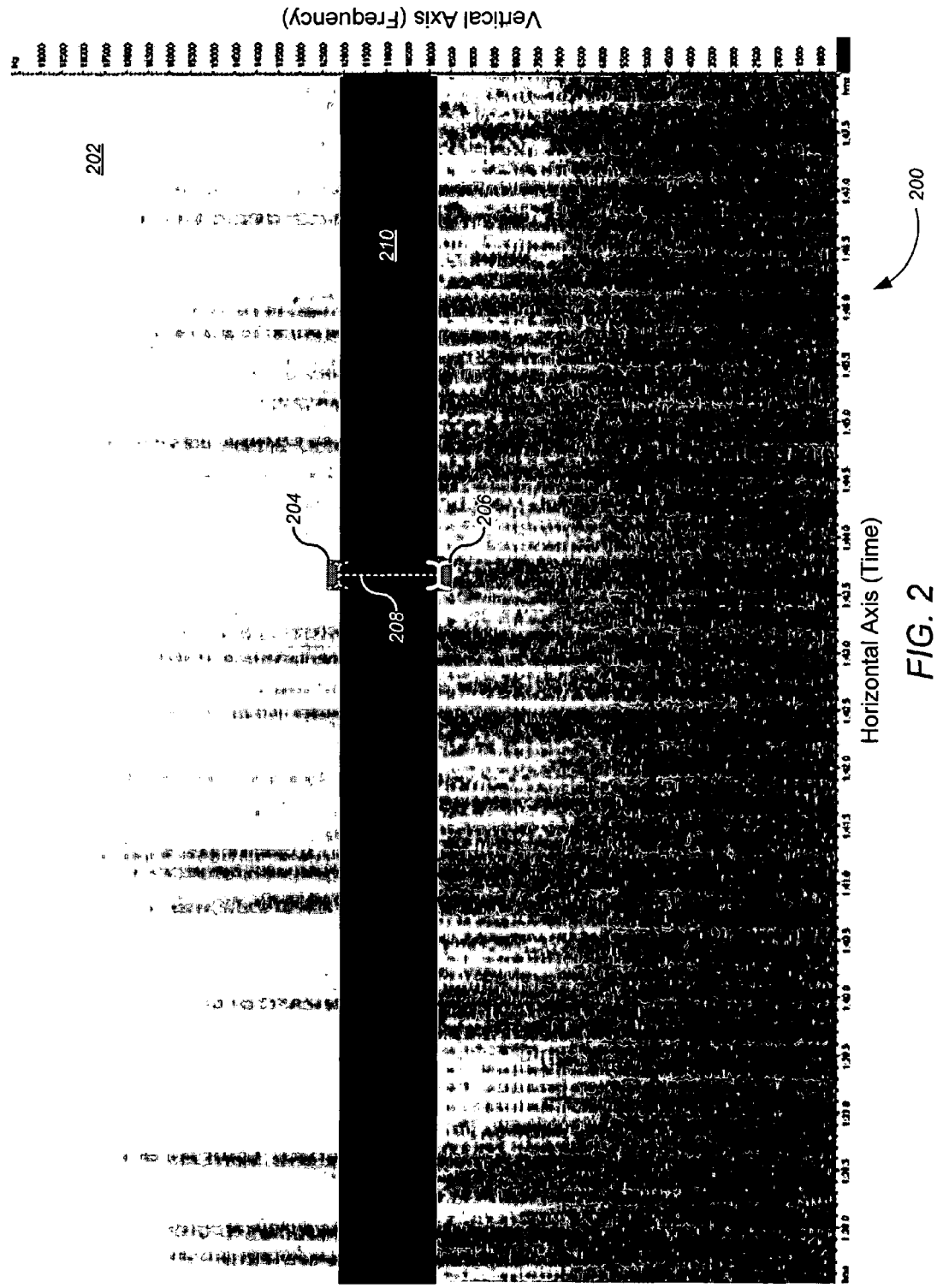
FIG. 2 shows an example display for selecting particular frequencies in a visual representation of audio data.
Figure 3:
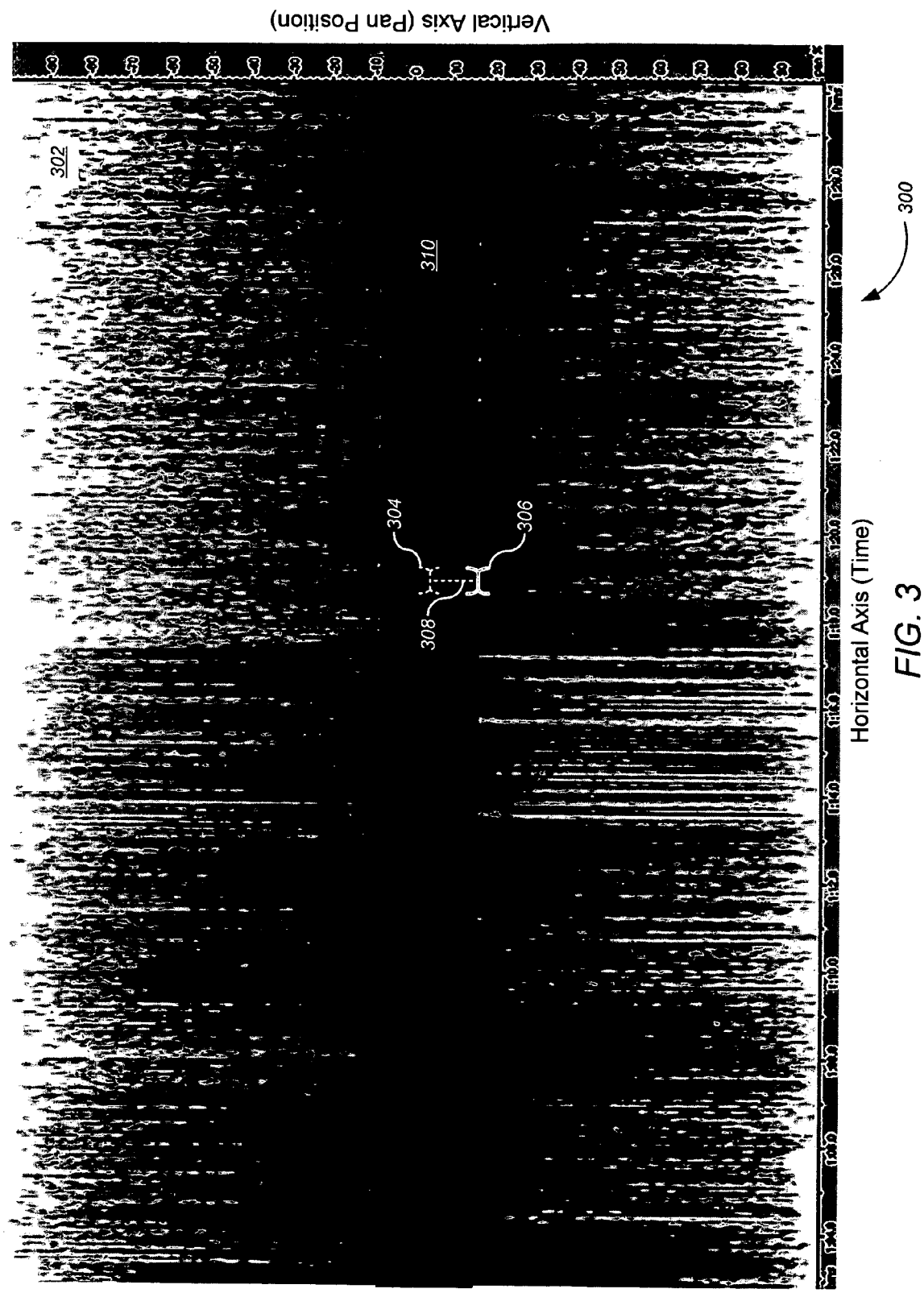
FIG. 3 shows an example display for selecting particular pan positions in a visual representation of audio data.

As shown in FIG. 1, the process 100 extends (108) the selection with respect to time. The selection can be extended by a predefined amount. For example, a selection can be extended in time from the beginning of the audio data to the end of the audio data to form an extended selection, such as frequency selection 210 or pan position selection 310 as shown in FIGS. 2 and 3, respectively. The extended selection includes the vertical feature selection based upon a user input, while the time selection is automatically extended from the beginning of the audio data to the end.

For example, a user using a particular selection tool can vertically drag the selection tool to select a range for the feature. Any user movement of the selection tool in the horizontal direction (e.g., selecting a range of time) is ignored by the system. For example, other selection tools define a selected region based on both x and y coordinates. Here, however, any x value resulting from the user input dragging the selection tool is disregarded. As a result, the movement of the selection tool selects a range for the feature only. A particular time range is automatically applied according to the predefined criteria (e.g., all of the audio data or for a particular preset time segment).

For example, a user can provide an input selecting a particular frequency band within the frequency spectrogram 202. After selecting a range of frequencies, the selection is automatically extended in the time domain to select those frequencies across the entire audio data. For example, the audio data can include noise at particular frequencies that the user wants to select in order to remove from the audio data using a particular editing process. The user can select those noise frequencies in a high resolution representation of frequency (e.g., by zooming into the frequency spectrogram to increase resolution) without having to drag the selection across all time.

In some implementations, the extended selection with respect to time is defined for different time ranges. For example, instead of extending the selection across the entire audio data, the extension can be defined according to preset time segments. In some implementations, the user can define one or more time windows to which the selection is extended (the "extended selection").

The process 100 performs (110) an editing operation on the audio data within the extended selection. Editing operations can be performed in response to an input, for example, input provided through user interactions with the displays 200 and 300. The editing operations can include, for example, amplifying or compressing audio data within the extended selection. The editing operations can also include the deletion of audio data within the extended selection as well as the processing of the audio data within the extended selection to generate one or more particular effects. For example, audio effects include amplifying, pitch shifting, flanging, reversing, and attenuating. For example, a pitch shifting effect can be applied to adjust the pitch of the audio data within the isolated region. A flanging effect is a time domain effect that applies an audio signal identical to the isolated audio data, except that the applied signal is time delayed by a small amount (e.g., 10 ms). In some implementations, the visual representation of the audio data is updated to illustrate the effect of the editing operation.

The process 100 stores (112) the edited audio data. For example, once the user has completed editing, the user can save the edited audio file and store it for playback, transmission, or other uses. Additionally, the user can make a one or more new selections within the visual representation and perform another editing operation on the new selections.

The process 100 can be implemented in digital electronic circuitry, or in computer software, firmware, or hardware, including the structures disclosed in this specification and their structural equivalents, or in combinations of one or more of them. The process 100 can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The process 100 can be implemented in a computing system that includes a back end component, e.g., as a data server, or that includes a middleware component, e.g., an application server, or that includes a front end component, e.g., a client computer having a graphical user interface or a Web browser _through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A method comprising:
   displaying a graphical visual representation of digital audio data, the representation displaying a feature of the audio data on a feature axis with respect to time on a time axis;
   receiving an input in the graphical visual representation selecting a range with respect to the feature where receiving the input comprises:
      receiving a first point selected in the graphical visual representation with a selection tool, the first point having a first feature value,
      receiving a dragging of the selection tool to a second point in the visual representation, the second point having a second feature value, and
      defining the range with respect to the feature using the first and second feature values; and
   automatically extending the selected range with respect to time to define a selected region of the visual representation using one or more computing devices, where the extended range with respect to time is predefined and ignoring any component of the received input with respect to time.

2. The method of claim 1, where the range with respect to the feature is the vertical range of feature values from the first point to the second point.

3. The method of claim 1, where the first point defines a center of the range such that the range is equal to twice the vertical displacement between the first point and the second point in the graphical visual representation.

4. The method of claim 1, where extending the selected range with respect to time includes defining an extended selection as a region defined by the selected range and the entire lengths of the audio data with respect to time.

5. The method of claim 1, where the visual representation is a frequency spectrogram and selecting a range of the visual representation with respect to the displayed feature includes selecting one or more frequencies of the frequency spectrogram.

6. The method of claim 1, where the visual representation is a pan position graph and selecting a range of the visual representation with respect to the displayed feature includes selecting one or more pan positions of the pan position graph.

7. The method of claim 1, further comprising:
   receiving an input to perform an editing operation on the extended selection; and
   performing the editing operation on the audio data.

8. A computer program product, encoded on a machine-readable storage device or substrate comprising instructions that when executed by data processing apparatus cause the data processing apparatus to perform operations comprising:

displaying a visual representation of digital audio data, the visual representation displaying a feature of the audio data with respect to time;

receiving an input in the visual representation corresponding to a selected range with respect to the feature where receiving the input comprises:

receiving a first point selected in the graphical visual representation with a selection tool, the first point having a first feature value, receiving a dragging of the selection tool to a second point in the visual representation, the second point having a second feature value, and defining the range with respect to the feature using the first and second feature values; and automatically extending the selected range with respect to time to define a selected region of the visual representation, where the extended range with respect to time is predefined and ignoring any component of the received input with respect to time.

9. The computer program product of claim 8, where the range with respect to the feature is the vertical range of feature values from the first point to the second point.

10. The computer program product of claim 8, where the first point defines a center of the range such that the range is equal to twice the vertical displacement between the first point and the second point in the graphical visual representation.

11. The computer program product of claim 8, where extending the selected range with respect to time includes defining an extended selection as a region defined by the selected range and the entire lengths of the audio data with respect to time.

12. The computer program product of claim 8, where the visual representation is a frequency spectrogram and selecting a range of the visual representation with respect to the displayed feature includes selecting one or more frequencies of the frequency spectrogram.

13. The computer program product of claim 8, where the visual representation is a pan position graph and selecting a range of the visual representation with respect to the displayed feature includes selecting one or more pan positions of the pan position graph.

14. The computer program product of claim 8, further comprising:

receiving an input to perform an editing operation on the extended selection; and performing the editing operation on the audio data.

15. A system comprising:

a user interface device; and one or more computers operable to interact with the user interface device and to:

display a visual representation of digital audio data, the visual representation displaying a feature of the audio data with respect to time;

receive an input in the visual representation corresponding to a selected range with respect to the feature; where receiving the input comprises:

receiving a first point selected in the graphical visual representation with a selection tool, the first point having a first feature value, receiving a dragging of the selection tool to a second point in the visual representation, the second point having a second feature value, and defining the range with respect to the feature using the first and second feature values; and automatically extend the selected range with respect to time to define a selected region of the visual representation, where the extended range with respect to time is predefined and ignoring any component of the received input with respect to time.

16. The system of claim 15, wherein the one or more computers comprise a server operable to interact with the user interface device through a data communication network, and the user interface device is operable to interact with the server as a client.

17. The system of claim 16, wherein the user interface device comprises a personal computer running a web browser, a mobile telephone running a WAP browser.

18. The system of claim 15, wherein the one or more computers comprises one personal computer, and the personal computer comprises the user interface device.

19. The system of claim 15, where the range with respect to the feature is the vertical range of feature values from the first point to the second point.

20. The system of claim 15, where the first point defines a center of the range such that the range is equal to twice the vertical displacement between the first point and the second point in the graphical visual representation.

21. The system of claim 15, where extending the selected range with respect to time includes defining an extended selection as a region defined by the selected range and the entire lengths of the audio data with respect to time.

22. The system of claim 15, where the visual representation is a frequency spectrogram and selecting a range of the visual representation with respect to the displayed feature includes selecting one or more frequencies of the frequency spectrogram.

23. The system of claim 15, where the visual representation is a pan position graph and selecting a range of the visual representation with respect to the displayed feature includes selecting one or more pan positions of the pan position graph.

24. The system of claim 15, further operable to:

receive an input to perform an editing operation on the extended selection; and perform the editing operation on the audio data.

* * * * *